(12) United States Patent
Gunn et al.

(10) Patent No.: US 6,717,153 B2
(45) Date of Patent: Apr. 6, 2004

(54) APPARATUS AND METHODS FOR MONITORING EMISSIONS

(75) Inventors: Richard Donald Gunn, Seascale (GB); Thomas Dockray, Seascale (GB)

(73) Assignee: British Nuclear Fuels PLC, Cheshire (GB)

( * ) Notice: Subject to any disclaimer, the term of this patent is extended or adjusted under 35 U.S.C. 154(b) by 153 days.

(21) Appl. No.: 10/003,971

(22) Filed: Nov. 2, 2001

(65) Prior Publication Data

US 2002/0066862 A1 Jun. 6, 2002

(30) Foreign Application Priority Data

Nov. 8, 2000 (GB) .............................................. 0027320

(51) Int. Cl.⁷ ................................................. G01T 1/18
(52) U.S. Cl. ...................... 250/381; 250/379; 250/385.1
(58) Field of Search ................................ 250/374, 375, 250/379, 381, 385.1

(56) References Cited

U.S. PATENT DOCUMENTS

| 4,264,816 A | 4/1981 | Walenta |
| 4,267,446 A | 5/1981 | Brown et al. |
| 4,426,580 A | 1/1984 | Smith |
| 4,740,730 A | 4/1988 | Uda et al. |
| 4,788,430 A | 11/1988 | Gonthier |
| 4,814,608 A | 3/1989 | Dempsey et al. |
| 4,853,536 A | 8/1989 | Dempsey et al. |
| 4,859,854 A | 8/1989 | Kershner et al. |
| 4,970,391 A | 11/1990 | Uber, III |
| 4,992,658 A | 2/1991 | Ramsey, Jr. et al. |

(List continued on next page.)

FOREIGN PATENT DOCUMENTS

| GB | 857005 | 12/1960 |
| GB | 1090745 | 11/1967 |
| GB | 2 202 369 A | 9/1988 |
| GB | 2 301 222 A | 11/1996 |
| GB | 2 337 108 A | 11/1999 |
| GB | 2 337 109 A | 11/1999 |
| GB | 2 337 110 A | 11/1999 |
| GB | 2 337 153 A | 11/1999 |
| GB | 2 337 155 A | 11/1999 |
| GB | 2 337 156 A | 11/1999 |
| GB | 2 338 060 A | 12/1999 |
| WO | WO 97/45754 | 12/1997 |
| WO | WO 98/38531 | 9/1998 |

OTHER PUBLICATIONS

L'Annunziata, *Handbook of Radioactivity Analysis*, Academic Press, ISBN 0–12–4362559, Aug. 1998, p. 157.

G. Muller et al., *Low–background Counting Using GE(Li) Detectors with Anti–muon–shields*, Nuclear Instruments and Methods in Physics Research A295, May 9, 1990, pp. 133–139.

Abstract of Japanese Patent No. JP 59–137875, published Aug. 8, 1984.

Primary Examiner—Constantine Hannaher
Assistant Examiner—Timothy Moran
(74) Attorney, Agent, or Firm—Workman Nydegger

(57) ABSTRACT

Ions produced by radioactive gases present in air impact on the sensitivity of contamination measuring instruments which detect ions generated by radioactive materials present on an item. Methods and apparatus address this issue by conducting a measurement of ions generated in a chamber by gaseous emitters and other background events in a volume of medium and deducting this from a measurement of ions generated in another chamber by the item as well as the gaseous emitters and background events. The variation of the gaseous emitters present within the medium is addressed by moving the medium about. An alternative solution uses a medium free of gaseous emitters having a significant level, for instance by sealed storage of air prior to its use in a method and instrument.

21 Claims, 2 Drawing Sheets

U.S. PATENT DOCUMENTS

| | | |
|---|---|---|
| 5,008,540 A | 4/1991 | Dempsey |
| 5,053,624 A | 10/1991 | Kronenberg |
| 5,055,674 A | 10/1991 | Kotrappa |
| 5,059,803 A | 10/1991 | Kronenberg |
| 5,107,108 A | 4/1992 | Ramsey et al. |
| 5,126,567 A | 6/1992 | Dempsey et al. |
| 5,128,540 A | 7/1992 | Stieff |
| 5,184,019 A | 2/1993 | MacArthur et al. |
| 5,187,370 A | 2/1993 | MacArthur et al. |
| 5,194,737 A | 3/1993 | MacArthur et al. |
| 5,281,824 A | 1/1994 | MacArthur et al. |
| 5,311,025 A | 5/1994 | MacArthur et al. |
| 5,371,363 A | 12/1994 | Lilimpakis |
| 5,426,305 A | 6/1995 | Siebentritt, Jr. et al. |
| 5,514,872 A | 5/1996 | Bolton et al. |
| 5,525,804 A | 6/1996 | MacArthur et al. |
| 5,539,208 A | 7/1996 | Overhoff |
| 5,550,381 A | 8/1996 | Bolton et al. |
| 5,663,567 A | 9/1997 | Steadman et al. |
| 5,679,958 A | 10/1997 | MacArthur |
| 5,877,502 A | 3/1999 | Koster et al. |
| 6,426,626 B1 * | 7/2002 | Kravis .................... 250/385.1 |

* cited by examiner

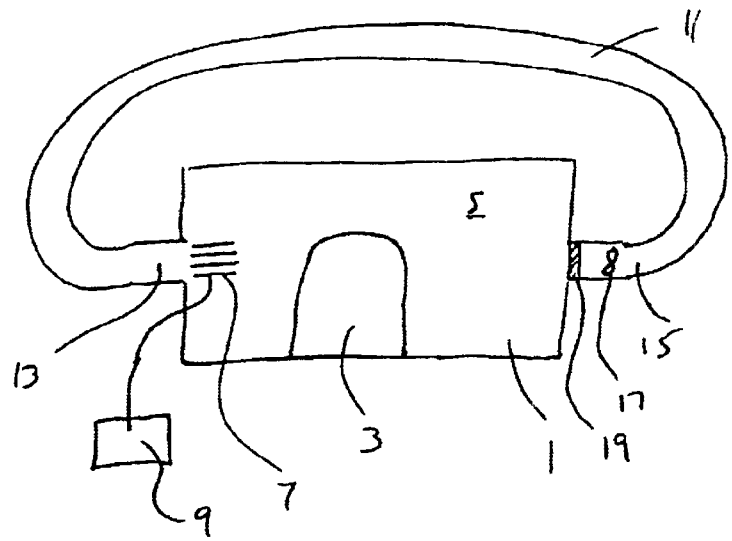
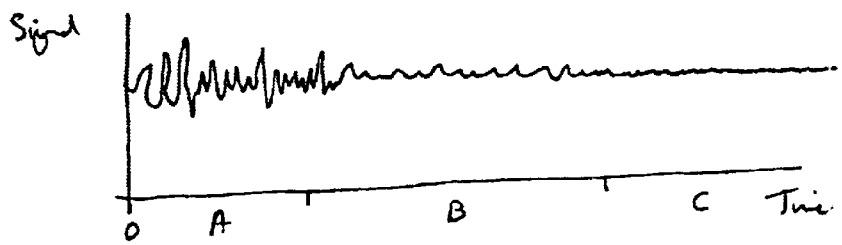
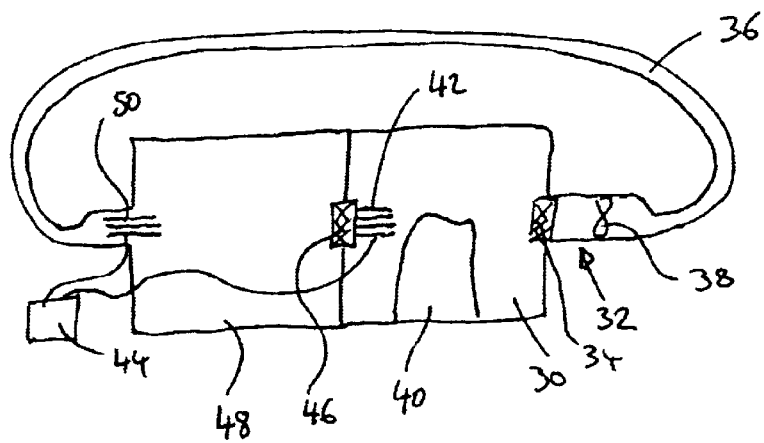
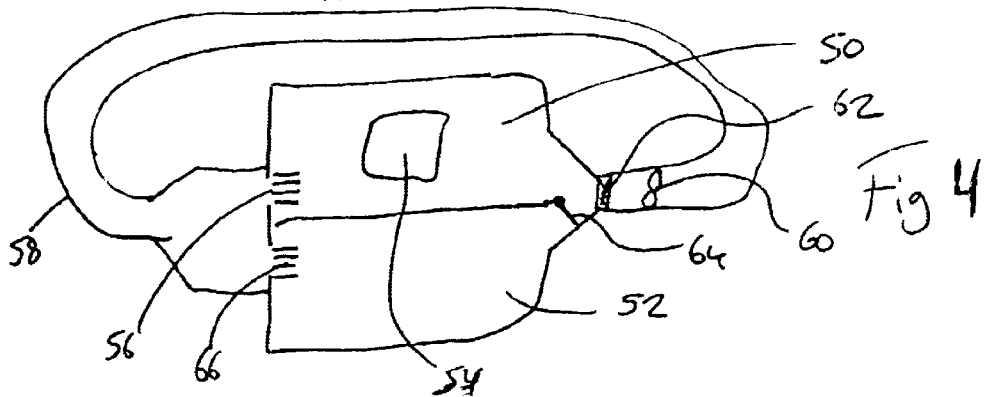

APPARATUS AND METHODS FOR MONITORING EMISSIONS

CROSS-REFERENCE TO RELATED APPLICATIONS

This application claims priority to United Kingdom Patent Application No. GB 0027320.1, filed Nov. 8, 2000, which is incorporated herein by specific reference.

BACKGROUND OF THE INVENTION

1. The Field of the Invention

The present invention relates to improvements in and relating to apparatus and methods for monitoring emissions, particularly, but not exclusively in relation to monitoring beta and most particularly alpha emissions.

2. The Relevant Technology

Techniques exist where by alpha sources can be monitored and a level of emission or contamination determined based on the detection of ions generated by the passage of the alpha and/or beta particles. Such techniques can be used to monitor pipes, tools and other items with a view to determining their level of contamination and hence determining their future fate. If contamination can be eliminated down to being below a certain threshold then the item can be stated as free release and not be subject to restrictions on its future handling and/or uses. Different thresholds are set for different potential forms of contamination, with different thresholds also be provided between different countries and/or sets of regulations.

Existing techniques and apparatus face problems in being sufficiently sensitive to measure to the necessary levels whilst accounting for background levels which are unknown and vary with time.

BRIEF SUMMARY OF THE INVENTION

The present invention aims to provide a method and instrument which accounts for variations in background emissions with time. The present invention aims to provide a method and instrument which is more sensitive.

According to a first aspect of the invention we provide a method of measuring for radioactive material, particularly contamination, in which an item to be measured for radioactive material is placed in a chamber in contact with a medium and the chamber is sealed, a detector for ions is provided in contact with the medium, the medium is moved about for a time period prior to the measurement of the level of ions present in the medium being performed, the level of ions in the medium being indicative of a characteristic of the radioactive material.

The chamber is preferably sealed against the surrounding environment of the instrument and in particular against the ingress of ions and/or radon and/or thoron from the environment.

The chamber may be provided with an inlet and/or an outlet. Preferably the outlet and inlet are joined by a connecting passage. Preferably the passage is sealed against the surrounding environment of the instrument and in particular against the ingress of ions and/or radon and/or thoron from the environment.

Preferably the medium is moved about by its leaving the chamber and reentering the chamber, ideally at different locations. The medium may be or may additionally be moved about within the chamber. The medium may be withdrawn from one end of the chamber, preferably the end nearest the detector. Preferably the medium is introduced to one end of the chamber, preferably the end nearer the item than the detector.

The medium may be moved about for more than 10 seconds, more preferably more than 100 seconds. The medium may be moved about for less than 600 seconds.

The inlet may be provided with a unit for moving the medium. The inlet may be provided with an ion filter. The outlet may be provided with a unit for moving the medium. The outlet may be provided with an ion filter.

The detector is preferably provided at or near the outlet. In particular the detector may be provided within the chamber closer to the outlet than to the item.

The measurement may be made after one or more checking measurements have been made. The checking measurements may investigate the fluctuations in the ion level with time. The measurement may be made after the fluctuations in the ion level pass below a threshold.

The first aspect of the invention may include any of the features, options or possibilities set out elsewhere in this document.

According to a second aspect of the invention we provide an instrument including a chamber into which an item to be measured can be placed, the chamber having a sealed state in which it contains a medium, means for moving the medium about the chamber and a detector, the detector being adapted to detect ions generated by emissions of radioactive material on the item in use.

The second aspect of the invention may include any of the features, options or possibilities set out elsewhere in this document.

According to a third aspect of the invention we provide a method of measuring for radioactive material, particularly contamination, in which an item to be measured for radioactive material is placed in a first chamber in contact with a medium, a second chamber also being provided, the first chamber and second chambers being provided such that the medium can pass through them, the first and second chambers being sealed, a detector for ions being provided in contact with the medium of the first chamber, a detector for ions being provided in contact with the medium of the second chamber, the medium being moved about during measurements, the level of ions present in the medium of the first chamber and the level of ions present in the medium of the second chamber being determined on one or more occasions, the level of ions in the first chamber being corrected according to the level of ions in the second chamber to give a corrected level, the corrected level of ions in the medium being indicative of a characteristic of the radioactive material.

The first chamber may be connected to the second chamber such that medium leaving the first chamber enters the second chamber. The first chamber may be provided with an inlet. The second chamber may be provided with an outlet. Preferably the inlet and outlet are joined by a passageway. The second chamber may be connected to the first chamber such that medium leaving the second chamber enters the first chamber. The second chamber may be provided with an inlet. The first chamber may be provided with an outlet. Preferably the inlet and outlet are joined by a passageway.

An ion filter may be provided at the entrance and/or exit of the first and/or second chambers. A unit for moving the medium may be provided at the entrance of the first chamber and/or at the exit of the second chamber and/or vice versa.

Preferably the medium enters the first chamber then passes to the second chamber then is recycled back to the first chamber.

Preferably measurements for the first chamber are conducted with medium flow through both first and second chambers. Preferably measurements for the second chamber are conducted with medium flow through both chambers. Preferably measurements for both chambers are conducted simultaneously.

Preferably a first detector is provided in the first chamber. Preferably a second detector is provided in the second chamber. Preferably the first and second detectors are distinct from one another. The first detector is preferably provided nearer the exit of the first chamber than the item is. The second detector is preferably provided near the exit in the second chamber and preferably in substantially the same position.

The first and second chambers may be provided in parallel with one another. The first chamber may be provided with an inlet and an outlet. Preferably the outlet is connected via a passageway to an entrance portion of the first and/or second chambers. The outlet may be connected to an exit portion. The second chamber may be provided with an inlet and an outlet. Preferably the outlet is connected via a passageway to an entrance portion of the first and/or second chambers. The outlet may be connected to an exit portion.

The first chamber may be provided within the second chamber or vice versa. The second chamber may be a pipe or other passageway passing through the first chamber. The second chamber may be a chamber defined in the bottom of the first chamber, for instance by a wall which is spaced from the outside wall of the structure defining the first and second chamber combination.

The first chamber may be provided outside the second chamber or vice versa. In particular the second chamber may be a pipe or other passageway provided outside the first chamber, but preferably linked to the entrance portion and/or exit portion which is connected to the first chamber.

The first and second chambers may be of equivalent, plus or minus 5%, size and/or volume and/or cross sectional profile.

The first and second chambers may be of different, for instance more than plus or minus 10% different, in terms of their size and/or volume and/or cross sectional profile. Preferably the level of ions measured by the detector for the respective first and second chambers with the same, known ion concentration is measured so as to link the responses of the two chambers.

The entrance portion may be provided with a unit for moving the medium, for instance a fan. The entrance portion may be provided with an ion filter. The entrance portion may be provided with a flow route control. Preferably the flow route control allows the medium to flow into the first chamber alone or alternatively the second chamber alone. The flow route control may be a valve.

Preferably during measurements for the first chamber the flow route control allows medium flow to the first chamber only. Preferably during measurements for the second chamber the flow route control allows medium flow to the first chamber only.

A first detector may be provided for the first chamber and a second detector may be provided for the second chamber. A common detector may be provided for the two chambers, for instance in the exit portion, The detector for the first chamber is preferably nearer the exit of the first chamber than the item is.

The level measured in the first chamber is preferably indicative of the ions generated by the contamination on the item and due to any gaseous emitters, such as radon and/or thoron present and due to any other background events such as cosmic radiation. The level measured in the second chamber is preferably indicative of the ions generated by any gaseous emitters such as radon and/or thoron present and due to any other background events such as cosmic radiation. The second chamber may be shielded to reduce or eliminate other background events. In such cases the second chamber level is indicative of the gaseous emitters, such as radon and/or thoron alone.

Preferably both detectors are connected to a processor. The processor preferably converts the current and/or discharge of a stored charge into one or more signals. Preferably the processor adjusts the first chamber result according to the second chamber result to give a corrected result. The process may adjust using an algorithm. The algorithm may include a multiplication factor to account for different size and/or volume and/or cross sectional profile first and second chambers.

The corrected level or result is preferably corrected against any radon present and in particular against any ions arising therefrom. The corrected level or result may be corrected against one or more other types of background event.

The third aspect of the invention may include any of the features, options or possibilities set out elsewhere in this document.

According to a fourth aspect of the invention we provide an instrument, the instrument including a first chamber into which an item to be measured for radioactive material is placed, a second chamber, the first and second chambers being sealed, a detector being provided in contact with the medium of the first chamber, and a detector being provided in contact with the medium of the second chamber, means for moving the medium through the first and/or second chamber being provided, processing means for correcting the detected signal from the first chamber according to the detected signal for the second chamber.

According to a fifth aspect of the invention we provide a method of measuring for radioactive material, particularly contamination, in which an item to be measured for radioactive material is placed in a chamber in contact with a medium and the chamber is sealed, a detector for ions being provided in contact with the medium, the medium being replaced by a further medium prior to the measurement of the level of ions present in the further medium being performed, the level of ions in the medium being indicative of a characteristic of the radioactive material, the further medium being free of gaseous emitters to a radioactivity level of below 5 Bq/m$^3$.

The gaseous emitters may be radon and/or thoron and/or other emitters. It is particularly preferred that gaseous emitters of alpha and/or beta particles are excluded to below the stated level.

The further medium is preferably the same as the medium, but has been isolated from the atmosphere for at least 5 days, more preferably 10 days and ideally 2 months. The medium and further medium may be air. Preferably the further medium is compressed prior to being introduced to the chamber.

The chamber may be connected to a storage volume, for instance a passageway, conduit or tank, in which medium entering the chamber is isolated to generate the further medium.

Preferably the further medium purges the chamber and/or other medium containing spaces of medium.

The further medium is preferably free of radon to a level below 0.5 Bq/m$^3$ and more preferably below 0.1 Bq/m$^3$ and The fifth aspect of the invention may include any of the features, options or possibilities set out elsewhere in this document.

According to a sixth aspect of the invention we provide an instrument, the instrument including a chamber into which an item to be measured for radioactive material is placed in use, the chamber containing a medium, a reservoir of further medium being provided, the instrument including means for displacing the medium using the further medium, the further medium being free of gaseous emitters to a radioactivity level of below 5 Bq/m$^3$.

The first and/or second and/or third and/or fourth and/or fifth and/or sixth aspects of the invention may include any of the features, options and possibilities set out elsewhere in this document, and in particular from the following features.

The detector may be in the form of a single electrode. The detector may be in the form of a charged element or disc, such as an electret. One or more, preferably all of the electrodes of the detector are planar. The electrodes may be continuous, such as a plate, or discontinuous, such as a grid.

Potentials of between 10 volts and 1000 volts may be applied to the detector.

Where a charged element or disc is used, the ions in the chamber may be monitored by monitoring the discharge of the charged element or disc element. Electrostatic charge monitoring means may be used for this purpose. Alternatively, current indicating means may be used.

It is preferred that the apparatus be provided with a detector including at least three electrodes. Preferably the electrodes are provided parallel to one another. The electrodes may be provided generally parallel to the flow of medium through the chambers and/or passed the detector. Preferably the electrodes are provided in opposition, an outer electrode being opposed by one electrode, an intermediate electrode being opposed by two electrodes. The spacing between the electrodes is preferably the same between each pair of opposing electrodes.

Preferably the ions reaching the detector are measured using a single current measuring means, for instance an electrometer. A floating point electrometer is preferred.

BRIEF DESCRIPTION OF THE DRAWINGS

Various embodiments of the invention will now be described, by way of example only, and with reference to the accompanying drawings in which:

FIG. 1 illustrates a first embodiment of an instrument according to the present invention;

FIG. 2 illustrates schematically the variation in detection signal with time using the instrument of FIG. 1 in one configuration;

FIG. 3 illustrates a second embodiment of an instrument according to the present invention;

FIG. 4 illustrates a third embodiment of an instrument according to the present invention;

DETAILED DESCRIPTION OF THE PREFERRED EMBODIMENTS

Figure 5:
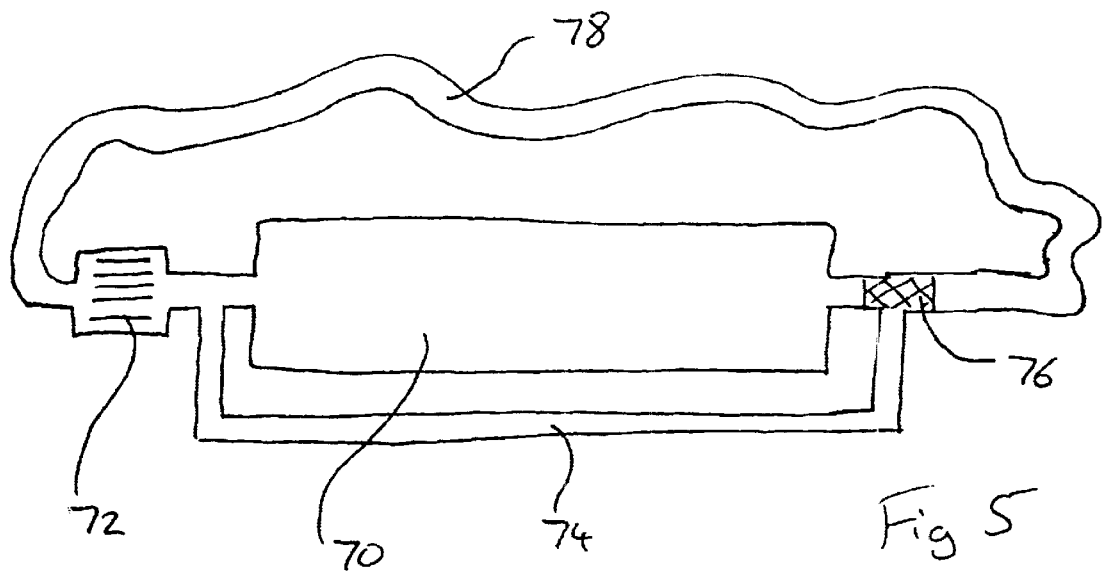
FIG. 5 illustrates a fourth embodiment of an instrument according to the present invention.

A variety of different instruments for detecting and/or measuring alpha emissions from radioactive materials are based around the concept of detecting ions generated by the passage of the alpha particles arising from the material in question. The ions are usually generated in air. The ions may be detected by electrostatically attracting them to a detector and/or by encouraging flow of the medium containing the ions past one or more detectors. The resulting current and/or discharge of a potential may be measured.

Problems arise with the sensitivity of such instruments as ions can be generated by other routes than due to the passage of the alpha particles from the material being detected and/or measured alone. In particular air contains radon in many situations and radon is a significant alpha particle emitter. Whilst ion filters on the instruments are used to remove ambient ions from air entering the instrument the filters do not remove the radon, thoron and any other less common gaseous emitters present. As a consequence the radon, thoron, and other less common gaseous emitters pass into the instrument, emit alpha particles and cause ions to be generated as a result. These ions are then detected and represent an error in the measurement as a result. A further problem is that the level of gaseous emitters, predominantly radon, entering the instrument with time varies considerably, and hence the error is not constant with time.

The error causes problems in measuring the level of emissions from contamination and/or confirming that emissions due to contamination are below a certain threshold as the noise and variation from background ion generating sources swamps measurements to that threshold or the ability to distinguish between contamination as the source and background as the source. This is a particular problem when measuring down to contamination levels of say 5 Bq or less. As a result existing instruments are not able to grade items as free release, following use of those items in a potentially plutonium contaminating location for instance, as acceptable measurements down to the necessary limit.

The present invention addresses this in one embodiment by providing a chamber 1 in which the item 3 to be monitored is provided. Contamination on the item 3 emits alpha particles which travel only a very short distance in the air 5 in the instrument and as a consequence are not suited to detection. The ions generated by the passage of the alpha particles are longer lasting and can be detected by a series of conductor plates 7 (shown schematically only) which feed the current arising to detector unit 9. The more contamination, the more alpha emissions, the more ions, the bigger the current. The air 5 though contains radon and this generates alpha emissions and hence ions as a result. The air 5 which enters the instrument when the item 3 is introduced has an unknown and varying level of radon in it.

Unlike many prior art systems which receive air from the environment and return it to the environment after passing the item and detector, the present invention recycles the air through passage 11 so that air leaving the chamber 1 through exit 13 is returned to entrance 15. A fan 17 is used to move the air around. An optional ion filter 19 may be provided at the entrance 15.

If the output from the detectors is considered against time, FIG. 2, then the signal is initially quite variable, portion A, in the moments after the chamber 1 is closed with the item 3 in it. After a few minutes the signal evens out, portion B, and after 5 minutes or so a far more even signal results, portion C. These results arise as initially the radon distribution in the air is uneven. As a result different parts of the air have higher levels of radon and hence ions, whereas others have lower levels. As the air is circulated through the instrument the flow and fan 17 even out the distribution of the radon. As a result the signal fluctuations are reduced and eventually settle out quite markedly. In this later portion C, the background effect is more even and hence greater emphasis on the results arising from contamination variations can be accepted. The sensitivity of the instrument is thus improved.

Using such a system, however, the actual background from the radon is not actually known. The embodiments of the invention illustrated in FIGS. 3 and 4 seek to address this issue.

In FIG. 3, the instrument includes a first chamber 30 which receives air through an entrance 32 which is provided with an ion filter 34. The filter removes substantially all the ions in the air entering the chamber 30 from pipe 36. Air is encouraged into the chamber 30 by fan 38. Any contamination on the item 40 gives rise to alpha emissions and hence ions in chamber 30. Radon in the air also contributes to the ions formed in chamber 30. The detector 42, shown schematically, measures these ions and a measurement is made by unit 44 as a result. The air then exits chamber 30 through ion filter 46 and enters second chamber 48. The second chamber 48 is empty of potentially contaminated items. The radon which flows with the air into the second chamber 48, however, generates ions here also. These are measured by detector 50 which provides a signal to unit 44 which measures a background count only. The unit 44 processes the two sets of signals and subtracts the background count from the total count to give a corrected count. Once again recirculation is used to advantage in evening out the radon distribution within the air in the instrument. As a consequence a consistent signal from the second chamber 48 is soon obtained. Subtraction is such cases does not need to allow for any time differential between the point at which the measurement for the first chamber 30 was made and the point in time at which the second chamber 48 was measured. If the radon concentration were not evened out then a time delay sufficient to allow the same air to have entered the second chamber 48 as was present when the first chamber 30 measurement was made.

As well as correcting for the background effects of radon the correction can be supplemented by heavily shielding the second chamber so as to remove ions generated by cosmic and other environmental radiation. These continue to contribute to the measurement for the first chamber 30.

Corrected the results are very closely attributable to contamination of the item 40 only. As a result far lower levels of contamination can be successfully made.

The embodiment of the invention illustrated in FIG. 4 works on a similar principle. In this case the instrument provides a first chamber 50 which is alongside the second chamber 52. The item 54 to be measured is placed in the first chamber 50 and air is passed through the chamber 50, past the detector 56 and into recirculation passage 58. The air reenters the chamber 50 via fan 60, ion filter 62 and control valve 64. Once again the ions are measured to give a result which measures the contamination plus a background effect due to radon and other factors. In this case, the background canceling measurement is obtained by changing the position of the valve 64 from that shown to a position where it isolates chamber 50 and passes the air to chamber 52. The detector 66 then measures the effect of the radon and the processing unit, not shown, can correct the first chamber result accordingly.

Figure 6:
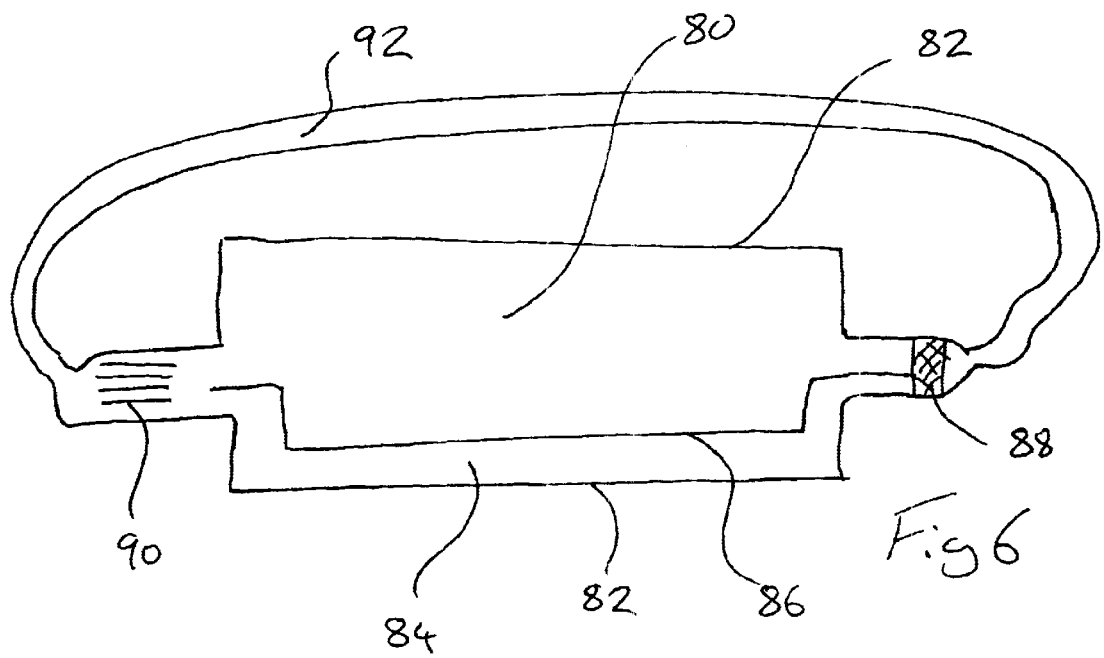
FIG. 6 illustrates a fifth embodiment of an instrument according to the present invention.

The second chamber could equally well be a by pass pipe provided outside an existing first chamber configuration, as illustrated in FIG. 5, or as a passage passing through the first chamber, as illustrated in FIG. 6. In the FIG. 5 embodiment, the first chamber 70 receives the items to be considered and ions are detected using the plates in detection chamber 72. The second chamber 74 is formed by a by-pass pipe with a valve unit 76 controlling the direction of flow of the medium to the first or second chambers. The circuit is completed by pipe 78 which returns the medium back to the entrances to the chambers. Such a system is particularly suited to retrofitting on existing first chamber designs as the first chamber itself is not altered. Calibration of the detectors 72 to measure signals arising from a given ion level when the medium passes through the first chamber 70 and alternatively through the second chamber 74 should be undertaken so as to allow for the different sizes of those chambers and different measurements which might arise as a result even for the same ion concentration. In the FIG. 6 embodiment, the first chamber 80 is defined by an overall housing outline 82 with the second chamber 84 being defined by the overall outline 82 and an internal element 86 which forms the bottom of the first chamber 80. Again, valve unit 88 controls the direction of flow of the medium into the chambers and detection unit 90 measures the ions which arise. The circuit is completed by pipe 92. Again, this design minimizes the impact on existing first chamber designs, but provides the background canceling function.

The above mentioned instruments and techniques can be assisted by purging the chambers and passages using air which has been isolated from the general environment/atmosphere for a few weeks. The short half life of radon means that such "old air" has a very low activity level and hence minimal contribution to the formation of ions as a result. Compressed air cylinders offer such a source of air. This technique could be used on its own to achieve significant benefits even without the other modes of background effect reduction or correction described above.

What is claimed is:

1. A method of measuring for radioactive material, the method comprising:

providing a first chamber containing a medium and providing a second chamber containing a medium, the first and second chambers being provided such that the medium can pass through them;

placing an item to be measured for radioactive material in the first chamber in contact with the medium;

sealing the first and second chambers;

providing a detector for ions in contact with the medium of the first chamber;

providing a detector for ions in contact with the medium of the second chamber;

moving the medium about during measurements;

determining the level of ions present in the medium of the first chamber and determining the level of ions present in the medium of the second chamber on one or more occasions; and correcting the level of ions in the first chamber according to the level of ions in the second chamber to give a corrected level, the corrected level of ions in the medium being indicative of a characteristic of the radioactive material.

2. A method according to claim 1 in which the first chamber is connected to the second chamber such that medium leaving the first chamber enters the second chamber.

3. A method according to claim 1 in which the second chamber is connected to the first chamber such that medium leaving the second chamber enters the first chamber.

4. A method according to claim 1 in which the medium enters the first chamber then passes to the second chamber then is recycled back to the first chamber.

5. A method according to claim 1 in which a first detector is provided in the first chamber, a second detector is provided in the second chamber and the first and second detectors are distinct from one another.

6. A method according to claim 1 in which the first and second chambers are provided in parallel with one another.

7. A method according to claim 6 in which the first chamber is provided with an inlet and an outlet and the outlet is connected via a passageway to an entrance portion of the first and/or second chambers.

8. A method according to claim 6 in which the second chamber is provided with an inlet and an outlet, the outlet is connected via a passageway to an entrance portion of the first and/or second chambers.

9. A method according to claim 6 in which the entrance portion of the first and/or second chambers is provided with a flow route control, the flow route control allowing the medium to flow into the first chamber alone or alternatively the second chamber alone.

10. A method according to claim 1 in which the level measured in the first chamber is indicative of the ions generated by the contamination on the item and due to any gaseous emitters present and due to any other background events and the level measured in the second chamber is indicative of the ions generated by any gaseous emitters and due to any other background events.

11. A method of measuring for radioactive material, the method comprising:
placing an item to be measured for radioactive material in a first chamber in contact with a medium;
providing a second chamber in contact with the medium, the first chamber and second chamber being provided such that the medium can pass through them;
sealing the first and second chambers being sealed;
providing a detector for ions in contact with the medium of the first chamber and providing a detector for ions in contact with the medium of the second chamber;
moving the medium about during measurements; and
determining the level of ions present in the medium of the first chamber and the level of the ions present in the medium of the second chamber on one or more occasions, these ion levels relating to a total count and a background count respectively, the background count being subtracted from the total count to produce a corrected count which is indicative of a characteristic of the radioactive material.

12. An instrument for measuring radioactive materials, the instrument comprising:
a first chamber adapted to receive an item to be measured for radioactive material, the first chamber being selectively sealed to form a first portion of a closed environment;
a first detector communicating with the first chamber, the first detector being configured to produce a first detection signal resulting from the detection of ions within the first chamber;
a second chamber being selectively sealed to form a second portion of the closed environment, the first chamber being either coupled or selectively coupled in sealed fluid communication with the first chamber;
a second detector communicating with the second chamber, the second detector being configured to produce a second detection signal resulting from the detection of ions within the second chamber;
a flow generator for moving a gaseous medium through the first and/or second chamber; and
a processor electrically coupled with the first detector and the second detector, the processor correcting the first detection signal according to the second detection signal.

13. An instrument comprising:
a first chamber into which an item to be measured for radioactive material is placed;
a second chamber, the first and second chambers being sealed;
a detector being provided in contact with the medium of the first chamber;
a detector being provided in contact with the medium of the second chamber;
a flow generator for moving the medium through the first and/or second chamber; and
a processor for subtracting the detected signal of the second chamber from the detected signal of the first chamber.

14. A method of measuring for radioactive material, the method comprising:
placing an item to be measured for radioactive material in a chamber in contact with a medium;
sealing the chamber;
providing a detector for ions in contact with the medium;
replacing the medium with a further medium; and
measuring the level of ions present in the further medium, the level of ions in the medium being indicative of a characteristic of the radioactive material, the further medium being free of gaseous emitters to a radioactivity level of below 5 $Bq/m^3$.

15. A method according to claim 14 in which the further medium is the same as the medium, but has been isolated from the atmosphere for at least 5 days.

16. An instrument comprising:
a chamber into which an item to be measured for radioactive material is placed in use, the chamber containing a medium; and
an enclosed reservoir of further medium, the further medium being free of gaseous emitters to a radioactivity level of below 5 $Bq/m^3$.

17. A method of measuring for radioactive material, the method comprising:
placing an item to be measured for radioactive material in a chamber in contact with a medium;
sealing the chamber;
providing a detector for ions in contact with the medium; and
moving the medium for a time period prior to a measurement of the level of ions present in the medium being performed, the level of ions in the medium being indicative of a characteristic of the radioactive material.

18. A method according to claim 17 in which the chamber is provided with an inlet and an outlet and the outlet and inlet are joined by a connecting passage.

19. A method according to claim 18 in which the detector is provided at or near the outlet.

20. A method according to claim 17 in which the medium is moved about by its leaving the chamber and reentering the chamber at different locations.

21. A method according to claim 17 in which the measurement is made after one or more checking measurements have been made, the checking measurements investigate the fluctuations in the ion level with time, the measurement being made after the fluctuations in the ion level pass below a threshold.

* * * * *

UNITED STATES PATENT AND TRADEMARK OFFICE
CERTIFICATE OF CORRECTION

PATENT NO. : 6,717,153 B2
DATED : April 6, 2004
INVENTOR(S) : Richard Donald Gunn and Thomas Dockray It is certified that error appears in the above-identified patent and that said Letters Patent is hereby corrected as shown below:

Column 1,
Line 16, insert -- , -- after "exclusively"
Line 16, insert -- , -- after "beta and"
Line 17, insert -- , -- after "particularly"
Line 20, change "where by" to -- whereby --

Column 5,
Line 4, change "0.1 Bq/m$^3$ and" to -- 0.1 Bq/m$^3$. --
Line 21, change "preferably all" to -- and preferably all, --

Column 6,
Line 11, insert -- , -- after "In particular"
Line 14, insert -- , -- after "the instrument"
Line 26, insert -- , -- after "threshold"
Line 31, change "of say" to -- of, say, --
Line 31, change "5 Bq" to -- 5 Bq/m$^3$ --
Line 32, insert -- , -- after "As a result"
Line 46, change "The air 5 though" to -- The air 5, though, --
Line 46, insert -- , -- after "radon"
Line 47, change "and hence ions" to -- and, hence, ions --

Column 7,
Line 29, insert -- , -- after "Once again"
Line 31, insert -- , -- after "consequence"
Line 45, insert -- , -- after "Corrected"
Line 50, insert -- , -- after "In this case"
Line 65, change "by pass" to -- by-pass --

Column 8,
Line 29, change "half life" to -- half-life --
Lines 63 and 66, insert -- the -- before "medium"

UNITED STATES PATENT AND TRADEMARK OFFICE
CERTIFICATE OF CORRECTION

PATENT NO. : 6,717,153 B2
DATED : April 6, 2004
INVENTOR(S) : Richard Donald Gunn and Thomas Dockray It is certified that error appears in the above-identified patent and that said Letters Patent is hereby corrected as shown below:

Column 9,
Line 26, insert -- , -- after "events"
Line 45, insert -- , -- before "respectively,"

Signed and Sealed this

Sixteenth Day of November, 2004

JON W. DUDAS
*Director of the United States Patent and Trademark Office*